(12) United States Patent
Rogers

(10) Patent No.: US 6,693,702 B2
(45) Date of Patent: Feb. 17, 2004

(54) LASER RANGE ESTIMATION AID

(76) Inventor: Mark Rogers, 1 Fingest Cottage, Near High Wycombe, Buckinghamshire (GB), HP14 3LR ( * ) Notice: Subject to any disclaimer, the term of this patent is extended or adjusted under 35 U.S.C. 154(b) by 0 days.

(21) Appl. No.: 09/953,583

(22) Filed: Sep. 11, 2001

(65) Prior Publication Data

US 2002/0046479 A1 Apr. 25, 2002

(51) Int. Cl.$^7$ .............................. G01C 3/00; G01C 5/00
(52) U.S. Cl. ............................ 356/3.1; 356/3; 356/3.11
(58) Field of Search .................. 356/3.1, 3.11, 356/3

(56) References Cited

U.S. PATENT DOCUMENTS

| 3,010,019 | A | * | 11/1961 | Sohst | .......................... 356/3.1 |
| 4,836,671 | A | * | 6/1989 | Bautista | |
| 4,902,130 | A | * | 2/1990 | Bouillot et al. | |
| 5,194,734 | A | * | 3/1993 | Whittaker et al. | |
| 5,298,977 | A | * | 3/1994 | Shintani et al. | |
| 6,366,344 | B1 | * | 4/2002 | Lach | .......................... 356/3.1 |
| 6,377,400 | B1 | * | 4/2002 | Hollander | |

FOREIGN PATENT DOCUMENTS

| GB | 21875709 | * | 9/1987 | .................. 356/3.1 |
| JP | 434305 | * | 5/1990 | |

* cited by examiner

Primary Examiner—Stephen C. Buczinski
(74) Attorney, Agent, or Firm—Davis & Bujold, P.L.L.C.

(57) ABSTRACT

In order to judge range with the laser range estimation aid the lasers (1, 2 and 3) should be activated via the switch (8) and directed at the target of range desired. The lasers (1, 2 and 3) should produce a triangle pattern of dots. If there is an upright triangle (10, 11), then the target is below or closer that the zero range. If there is a single dot, then target is substantially at the zero range (12). If there is an inverted triangle (13, 14), then the target is above or further away from the zero range. Also, the size of the pattern produced can be found relative to the terrain which allows for further range calculation.

6 Claims, 1 Drawing Sheet

Fig. 1
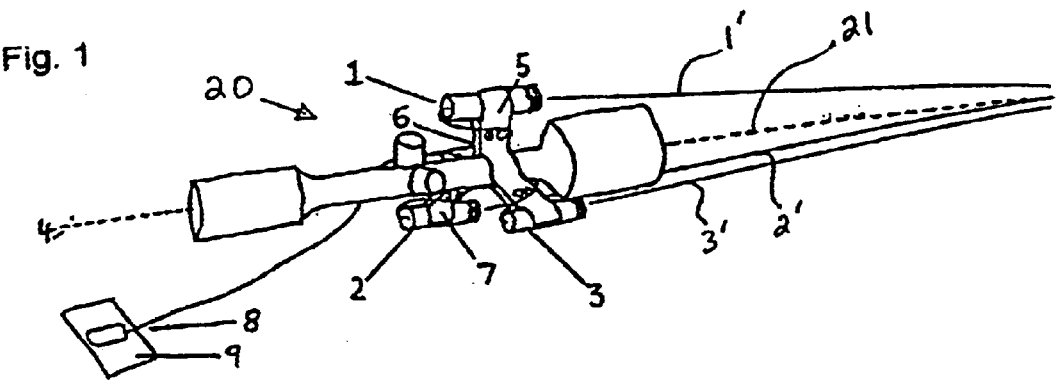
Fig. 2A    Fig. 2B    Fig. 2C    Fig. 2D    Fig. 2E
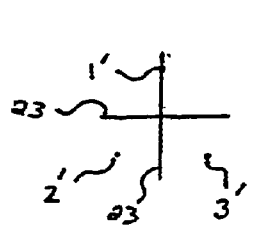 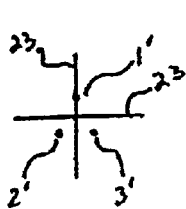 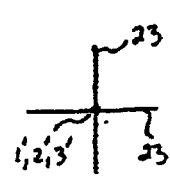 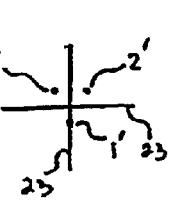 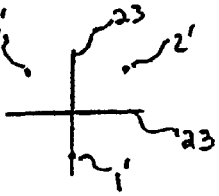
Fig. 3
Fig. 4
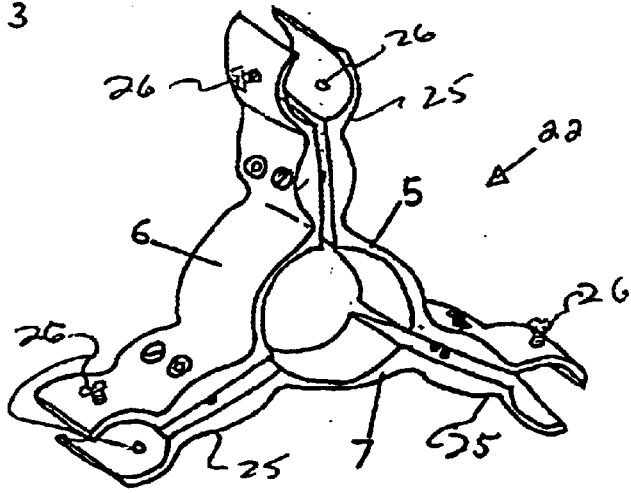

LASER RANGE ESTIMATION AID

This invention relates to a laser range estimation aid.

BACKGROUND OF THE INVENTION

From the prior art a system which uses a single laser relative to a line of sight of the cross hairs is known. This system has the following problems or draw backs. First, it is often difficult to judge changes in distance between the cross hair and laser, especially at longer ranges. The prior art range system generally cannot be estimated without the use of a scope. Thirdly, the prior art range system is generally fairly bulky and cumbersome.

SUMMARY OF THE INVENTION

The present invention utilizes a distinct projected triangle of laser dots, which can be more easily used to compare the size of the triangle relative to the terrain that it is projected at or viewing. The present invention can be used without a scope (the pattern is a triangle below or closer than its zero range, it is a single dot at its zero range, it is an inverted triangle above or greater than its zero range). In addition, the present invention is less bulky and more compact than prior art designs as the lasers do not need to stick out as far as with the designs of the prior art.

A laser range estimating device comprising an aid having mounted on it two or more lasers in a predetermined configuration relative to one another providing for angular adjustment of the lasers, or at least of the beams emanating from the lasers, so that the beams can be focused or adjusted to converge with one another to a single point at a desired distance or range from the laser range estimating device.

BRIEF DESCRIPTION OF THE DRAWINGS

A specific embodiment of the invention will now be described, by way of example, with reference to the accompanying drawings in which:

FIG. 1 is a diagrammatic perspective view showing the entire laser rangefinder, a scope, the line of sight of the scope and the emitted beams of the lasers.

FIGS. 2A–2E are diagrammatic views showing an image of the emitted laser beams of FIG. 1 when viewed through the scope of FIG. 1 at different distances along the line of sight of the scope.

FIG. 3 is a diagrammatic view showing convergence of the laser beams, of FIG. 1, along the line of sight.

FIG. 4 is a diagrammatic perspective view showing just the holder without inner pads.

DESCRIPTION OF THE PREFERRED EMBODIMENTS

With reference now to the drawings, the laser range estimation aid or device 20 consists of or generally comprises at least three (3) separate lasers 1, 2 and 3. The three (3) lasers are supported in a fixed equilateral triangle relationship or position about a scope, with a center of the formed equilateral triangle being concentric with the line of sight 21 of the scope 4. The three (3) separate lasers 1, 2 and 3 are conventional lasers and are held or supported in their desired fixed position by means of a holder 22. The holder 22 generally comprises three (3) identical components or main pieces 5, 6 and 7 which, when screwed or fastened to one another by a plurality of screws or bolts (not numbered), form the holder 22 which both clamps to an outer periphery of the scope 4 (see FIG. 1) and also clamps to an outer periphery of each one of the three (3) separate lasers 1, 2 and 3 (also see FIG. 1). If desired or necessary, a protective or friction material(s), layer or sheet(s) may be provided between an inwardly facing surface of the holder 22 and an outwardly facing surface of each lasers 1, 2 and 3 and/or between an inwardly facing surface of the holder 22 and an outwardly facing surface scope 4 to facilitate a more secure clamping or attachment of the laser range estimation aid or device 20 to the lasers 1, 2 and 3 and/or the scope 4.

Each one of the lasers is preferably connected to a common switch 8 by cabling (not numbered) which, when the switch 8 is in a first active position, activates all three lasers 1, 2 and 3 so that they each emit a laser beam 1', 2', 3' and, when in a second inactive position, deactivates or "turns off" all three lasers 1, 2 and 3 to discontinue emitting the laser beams. The common switch 8 can be attached to any readily accessible part of a gun or other fire arm 24 (only diagrammatically shown) by means of mating touch fasteners, such as a Velcro® brand hook and loop fasteners, with a first portion of the touch fastener attached to an exterior surface of the gun or fire arm 24 by an adhesive and a second mating portion of the touch fastener also attached to a bottom exterior surface of the switch 8 by an adhesive.

With reference now to FIG. 2B, a diagrammatic view showing the orientation of the three emitted laser beams 1', 2' and 3', with respect to the cross hairs 23 of the scope 4, when the sighted target is located closer to the device than a desired or zero range distance of the scope 4. FIG. 2A is a diagrammatic view showing the orientation of the three emitted laser beams 1', 2' and 3', with respect to the cross hairs 23 of the scope 4, when a sighted target is located still closer to the device than the desired or zero range distance of the scope 4.

With reference now to FIG. 2C, a diagrammatic view showing the orientation of the three laser beams 1', 2' and 3', with respect to the cross hairs 23 of the scope 4, when a sighted target is located substantially at the desired or zero range distance of the scope 4—all three laser beams 1', 2' and 3' substantially converge with one another to form a single point or dot.

FIG. 2D is a diagrammatic view showing the orientation of the three laser beams 1', 2' and 3', with respect to the cross hairs 23 of the scope 4, when a sighted target is located further away from the device than the desired or zero range distance of the scope 4. Finally, FIG. 2E is a diagrammatic view showing the orientation of the three laser beams 1', 2' and 3', with respect to the cross hairs 23 of the scope 4, when a sighted target is located still further away from the device than the desired or zero range distance of the scope 4.

Each one of the three arms 25 of the holder 22 is provided with a conventional adjustment mechanism 26, e.g. one or more set screws, only diagrammatically shown to facilitate fine adjustment of the emitted direction of each one of the laser beams 1', 2' and 3' to achieve convergence of the three laser beams 1', 2', 3' with one another at the "sighted" distance or range. Alternatively, each one of the lasers 1, 2, 3 can have an internal adjustment to achieve convergence of the three laser beams 1', 2', 3' with one another at the "sighted" distance or range.

The laser range estimation aid is useful in determining whether a target is located closer than or further away from a "sight" distance or range of a fire arm, equipped with a scope, so that an operator of the fire arm can make any necessary compensation or adjustment to his or her aim of the fire arm, depending upon the determined or perceived distance of the target relative to the "sighted" distance, prior to discharging the same.

Since certain changes may be made in the above described improved laser range estimation aid, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A light emitting range indicating device to facilitate direct visual determination of distance to a target, the device comprising:

an optical magnifying scope defining a central line of sight;

a housing mounted on the scope supporting a plurality of light emitting devices in a symmetrical relationship about the central line of sight and each of the light emitting devices emitting a respective visible light beam;

a point of convergence spaced from the optical magnifying scope where the visible light beams from the plurality of light emitting devices coincidentally converge along the central line of sight; and wherein the optical magnifying scope visually displays the light beams relative to the central line of sight directly indicating whether the target observed along the central line of sight is spaced form the point of convergence.

2. The light emitting range indication device as set forth in claim 1, wherein the optical magnifying scope visually displays the light beams relative to the central line of sight in a visually distinctive pattern on the target depending upon the target distance from the point of convergence.

3. The light emitting range indication device as set forth in claim 2, wherein the visually distinctive pattern of the light beams varies radially with respect to the central line of sight depending upon the target distance from the point of convergence.

4. The light emitting range indication device as set forth in claim 3 further comprising an adjustment mechanism providing for angular adjustment of the light emitting devices relative to the central line of sight so that the plurality of light beams emanating from the plurality of light emitting devices can be adjusted to converge with one another at the point of convergence.

5. The light emitting range indication device as set forth in claim 4, wherein the central line of sight is visually represented by cross hairs observed through the optical magnifying scope.

6. A laser range indicating device comprising:

an optical magnifying scope having visible cross hairs defining a line of sight;

a housing mounted on the scope supporting a plurality of lasers in a symmetrical relationship about the central line of sight and each of the lasers emitting a respective visible light beam;

a point of convergence spaced from the optical magnifying scope where the visible light beams from the plurality of lasers coincidentally converge along the central line of sight; line of sight is spaced from the point of convergence; and wherein the optical magnifying scope visually displays the light beams relative to the cross hairs directly indicating whether a target aligned along the central line of sight is spaced from the point of convergence; and wherein the optical magnifying scope visually displays the light beams relative to the cross hairs in a visually distinctive pattern on the target which varies radially with respect to the cross hairs depending upon the target distance from the point of convergence.

* * * * *